US005230133A

United States Patent [19]

[11] Patent Number: 5,230,133
[45] Date of Patent: Jul. 27, 1993

Esposito

[54] METHOD OF IDENTIFYING COOPERATING PARTS

[76] Inventor: Pasquale Esposito, 6650 W. Archer Ave., Chicago, Ill. 60638

[21] Appl. No.: 822,158

[22] Filed: Jan. 17, 1992

[51] Int. Cl.[5] ............ B23P 19/00

[52] U.S. Cl. ............ 29/426.2; 116/201; 283/36; 283/70; 283/74; 283/114; 283/117

[58] Field of Search ........... 29/402.03, 402.09, 402.12, 29/402.14, 426.2, 426.4, 439, 464; 283/70, 74, 36, 114, 117; 116/201, 211, 278

[56] References Cited

U.S. PATENT DOCUMENTS

| | | | |
|---|---|---|---|
| D. 251,121 | 2/1979 | Smith . | |
| 784,840 | 3/1905 | Crosby | 283/74 X |
| 2,621,501 | 12/1952 | Jenkins | 283/74 X |
| 2,907,586 | 10/1959 | Paxton et al. | 283/70 |
| 3,851,386 | 12/1974 | Ellzey, Jr. | 116/201 X |
| 3,994,085 | 11/1976 | Groselak . | |
| 4,408,406 | 10/1983 | Barton . | |
| 4,592,157 | 6/1986 | Kerr | 283/70 X |
| 4,887,543 | 12/1989 | Rockhill | 116/201 |
| 4,978,144 | 12/1990 | Schmidt et al. | 283/70 |

FOREIGN PATENT DOCUMENTS

| | | |
|---|---|---|
| 1468280 | 2/1967 | France . |
| 960859 | 6/1964 | United Kingdom . |

*Primary Examiner*—Mark Rosenbaum
*Assistant Examiner*—C. Martin
*Attorney, Agent, or Firm*—Milton S. Gerstein; Marvin Benn

[57] ABSTRACT

A plurality of pairs of identifying tags are provided. Each pair is made up of two identical tags, with each tag of each pair having a main, elongated, body-portion, preferably made of plastic, such as polyvinylchloride, in which is embedded a thin, elongated strip of flexible, pliable steel wire. In the preferred embodiment, the main, elongated body-portion is formed along a portion of its length with toothed projections which serve in aiding to retain the tag in a hole, when the respective tag is to be used for identifying a hole associated with a mating screw. The embedded steel wire helps to retain the shape of the tag when the tag is bent or wrapped about a workpiece or component being identified. In one embodiment of the invention, the ends of the steel wire project outwardly beyond the ends of the plastic main body-portion, so that the ends of the wire may be twisted together to removably hold tag on the workpiece or component being identified, after the tag has been bent thereabout. The main body-portion has identifying indicia thereon which is the same as that of the other tag of the respective pair of tags, such indicia being a number, letter, color code, or the like. By removably securing the pair of tags to two disassembled workpieces, a repairman will later know which parts are to be re-assembled back together.

16 Claims, 3 Drawing Sheets

FIG. 1
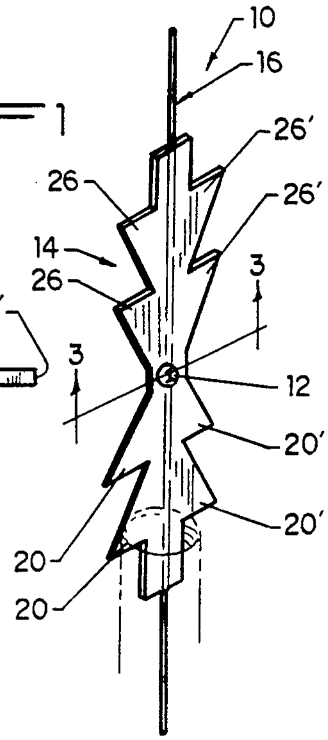
FIG. 2
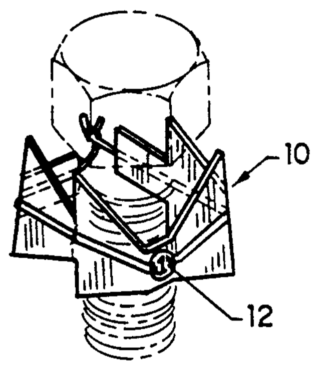
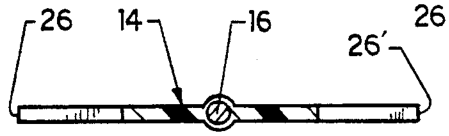
FIG. 3
FIG. 4
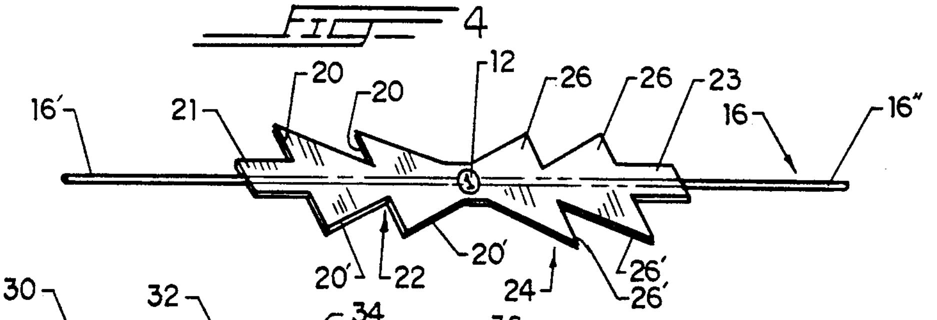
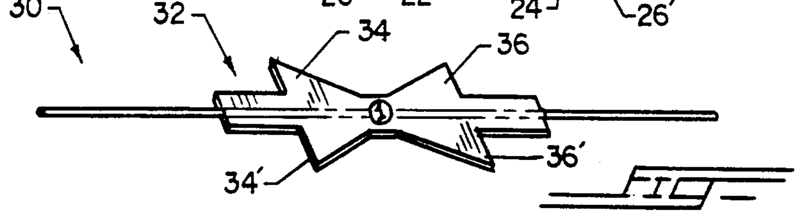
FIG. 5
FIG. 6
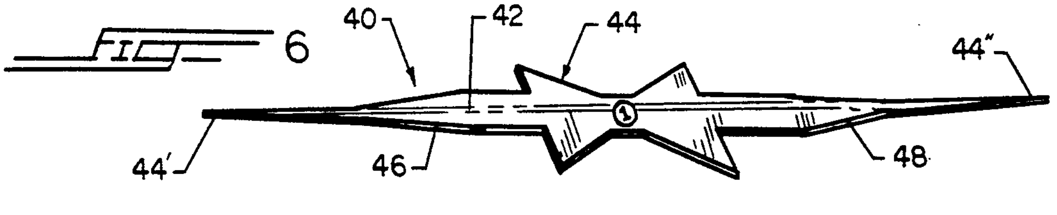
FIG. 7
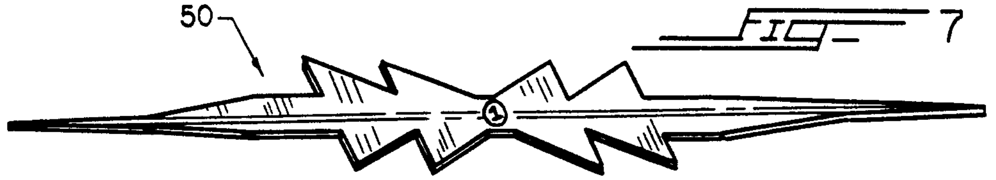

METHOD OF IDENTIFYING COOPERATING PARTS

BACKGROUND OF THE INVENTION

The present invention is directed to a method of identifying, or labelling, cooperating parts after the cooperating parts have been disassembled from each other for purposes of repair, or for general disassembly of parts. The present invention has especial relevance to the repair of automotive engines, during which many parts may be disassembled and mixed up, thereby causing a mechanic to forgot which part is associated with which other part. The invention may be used in other areas as well, such as electrical repair, where parts are also disassembled and ofttimes mixed up, which also may require much time and effort on the part of the repairman, in order to find the right, mating part for a component when reassembly is performed after the repair. Any field in which cooperating parts must be assembled, such as do-it-yourself kits, or the like, where the parts are put together for the first time by the owner, may use the invention in order to identify cooperating, or mating, parts, or components, for subsequent assembly or re-assembly.

SUMMARY OF THE INVENTION

It is the primary objective of the present invention to provide a method of identifying, or labelling, individual components-parts of mating, or cooperating, component-parts in order to aid a person in the assembly for the first time, or re-assembly of the component-parts.

It is also an objective of the present invention to provide pairs of individual, identity tags, or labels, which may be used for removable securement to cooperating, or mating, component-parts, by which cooperating or mating parts are uniquely labelled for subsequent assembly together. One pair of identity tags is used for any pair of cooperating or mating parts, with each tag of each pair having a similar or same identifying mark indicating its pairing with the other tag of the pair.

It is still another objective of the invention to provide identifying tags that are readily, easily and removably to the component-parts to be tagged, by encircling each tag about a respective part and twisting the ends of the tag together.

It is objective of the invention to provide different series of identifying tags, with each series being comprised of a plurality of different pairs of identifying tags, where each successive series has tags of slightly larger size, whereby parts of different sizes may be tagged, and, whereby, a multiple of different fields, arts, and environments may be accommodated for using the tags and method of the present invention.

Toward these and other ends, the present invention provides a plurality of pairs of identifying tags. Each pair is made up of two identical tags, with each tag of each pair having a main, elongated, body-portion, preferably made of plastic, such as polyvinylchloride, in which is embedded a thin, elongated strip of flexible, pliable, steel wire. In the preferred embodiment, the main, elongated body-portion is formed, along a portion of its length, with toothed projections which serve in aiding to retain the tag in a hole, when the respective tag is to be used for identifying a hole associated with a mating screw. The embedded steel wire helps to retain the shape of the tag when the tag is bent or wrapped about a workpiece or component being identified. In one embodiment of the invention, the ends of the steel wire project outwardly beyond the ends of the plastic main body-portion, so that the ends of the wire may be twisted together to removably hold the tag on the workpiece or component being identified, after the tag has been bent thereabout. In another embodiment, the length of the steel wire is approximately coextensive with the length of the plastic, main body-portion, with the ends of the main body-portion being twisted together themselves, along with the ends of the steel wire, in order to achieve the removable securement of the tag to a workpiece or component to be identified as part of a cooperating pair. In this version, the ends of the main body-portion may taper inwardly to end in a narrow or sharp strip which is more readily capable of twisting. The main body-portion has identifying indicia thereon which is the same as that of the other tag of the respective pair of tags, such indicia being a number, letter, color code, or the like.

BRIEF DESCRIPTION OF THE DRAWINGS

The invention, will be more readily understood with reference to the accompanying drawing, wherein:

FIG. 1 is an isometric view showing a first identifying tag of the invention of a pair of identifying tags inserted into a threaded hole;

FIG. 2 is an isometric view showing a second, identical, identifying tag of the same pair of identifying tags, wrapped about a workpiece, such as a bolt, that is matedly received in the threaded hole of FIG. 1;

FIG. 3 is a cross-sectional view taken along line 3—3 of FIG. 1;

FIG. 4 is an isolated, perspective view of the tag of the invention, according to the first embodiment thereof;

FIG. 5 is a perspective view of the tag of the invention according to a second embodiment thereof;

FIG. 6 is a perspective view of the tag of the invention according to a third embodiment thereof;

FIG. 7 is a perspective view of the tag of the invention according to a fourth embodiment thereof;

DETAILED DESCRIPTION OF THE INVENTION

Figure 8:
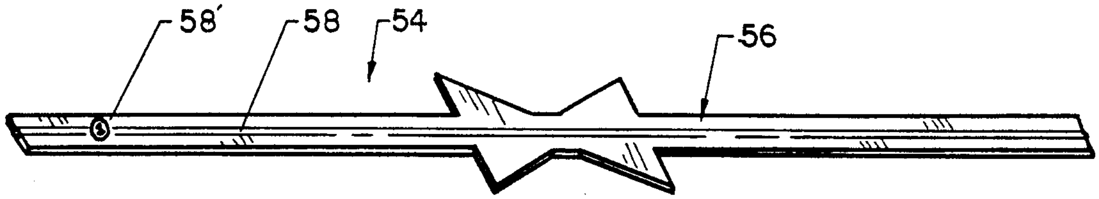
FIG. 8 is a perspective view of the tag of the invention according to a fifth embodiment thereof.

Referring now to the drawings in greater detail, and to FIG. 1-4 for now, there is shown an identifying tag 10 of the invention for use according to the method of the invention, as disclosed hereinbelow. According to the method of the invention, there are provided a plurality of pairs of identical identifying tags 10. Each tag 10 of each of pair of tags is provided with the same, indicating indicia 12, such as a numeral, as seen in FIGS. 1, 2 and 4. These identical indicia indicate that the two tags of each pair are, in fact, a pair. Each pair of tags will have its own, unique identifying indicia 12. For example, when ten pairs of tags are provided, the ten pairs of tags will have identifying indicia running from 1 through 10; two tags will have the reference indicia "1", two the reference indicia "2", and so on. Each pair of tags is used for identifying, or tagging, two mating, or cooperating parts that either have been disassembled, or are to be assembled for the first time. FIGS. 1 and 2 show just one of the myriad number of examples for which a pair of tags 10 may be used. In FIG. 1, a first tag of a pair of tags is inserted into the interior of a threaded hole, while, in FIG. 2, the bolt, or screw, which was unscrewed from the hole of FIG. 1, is enwrapped with a second tag of that pair of tags. With each tag 10 of FIG. 1 and 2 having the same identifying indicia 12, thereon, it is clear, when the two parts are to be reassembled, or assembled for the first time, just which bolt goes into which hole. Other pairs of tags having different, identifying indicia 12 are used for identifying other cooperating or mating parts or components, such as additional bolt/hole combinations, or the like. Other cooperating, or mating, parts, or components, may be an end of a water hose, and the coupling to which the end of the hose is to be, or was, attached. The number of such couples are too numerous to mention, it being understood that the same method of the invention would apply, with the only difference being the size of the tags 10 provided for use in any particular environment, use, or art. Since each tag 10 serves a dual function of labelling a part or component either by insertion of the tag into a hole or cavity, or by wrapping about a circumferential portion thereof, the two tags of each pair may be used similarly. That is, each tag of the pair may be wrapped about a respective mating or cooperating part, or both may be inserted into a respective hole, or one may be inserted into a hole of one part and the other of the pair enwrapped about the other part, as in the manner of FIGS. 1 and 2.

The actual structure of the tag 10 may vary. The preferred embodiment is shown in FIGS. 1–4, where each tag of each pair of tags is able to be removably secured to a workpiece, part, or component either by enwrapment about a portion of the circumference thereof, or by insertion into a hole, cavity, depression, or the like thereof, for the reasons set forth supra. Each tag 10 has a main body-portion 14 that is preferably made of a pliable, flexible plastic, such as polyvinylchloride (PVC). Extending through, and embedded in, the main body-portion 14 is a small-diameter steel wire 16. The main body-portion 14, with embedded steel wire, may be formed by conventional, injection molding techniques, with the steel wire inserted into the injection-mold, or may be made by other, plastic-forming methods. The flexible, main body-portion 14 defines two opposed edge-surface that define serrations or toothed surfaces. A first half 22 of the main body-portion 14 defines left-handed serrations 20, 20', as best seen in FIG. 4, on the edge-surfaces, while the second half 24 defines right-handed serrations 26, 26' on the edge-surfaces. The central or middle section 14' of the main body-surfaces portion 14 separates between the two halves, and has the identifying indicia 12 emplaced thereon. The identifying indicia 12 may be located on both surface faces of the middle section, so that the respective indicia for that tag-pair may be visible from front or back. The main body-portion 14 terminates in ends 21, 23, from which ends project ends 16', 16'' of the embedded steel wire 16. The tag 10 may be used in two ways for identifying a cooperating workpiece, component, part, etc. As seen in FIG. 2, it may wrapped about a portion of the circumference of the workpiece and removably retained thereon by twist-tying together the ends 16',16'' of the steel wire 16, as clearly seen in FIG. 2. The identifying indicia 12 is clearly visible thereby. In this use of the tag 10, the indentations, or relief, between adjacent teeth or serrations, as well as the reduced width of the middle section, allow for a more, easy bending or "wrapping" of the tag 10 about the workpiece, since the plastic material will more easily bend about these relieved sections.

Figure 10:
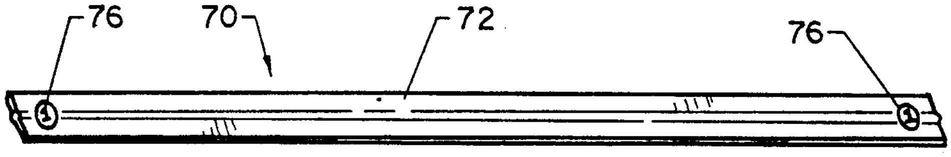
FIG. 10 is a perspective view of the tag of the invention according to a seventh embodiment thereof.
Figure 11:
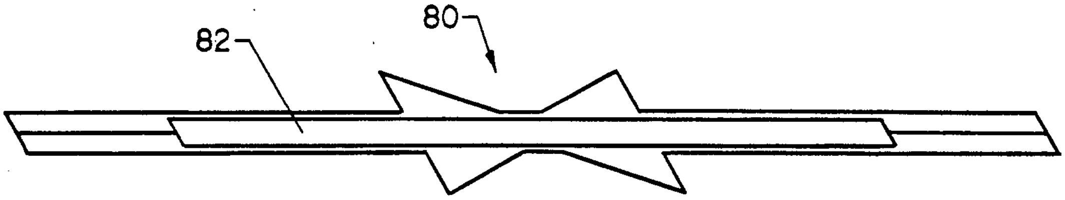
FIGS. 11-14 are perspective views showing still other modifications of the tag for use with the method of the invention.
Figure 12:
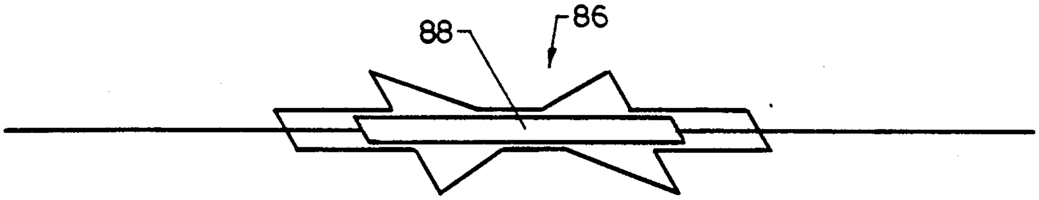
Figure 13:
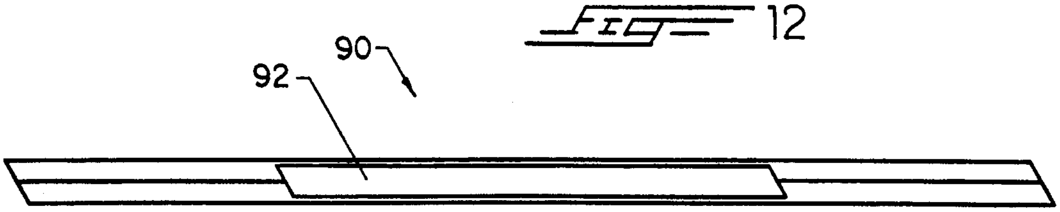
Figure 14:
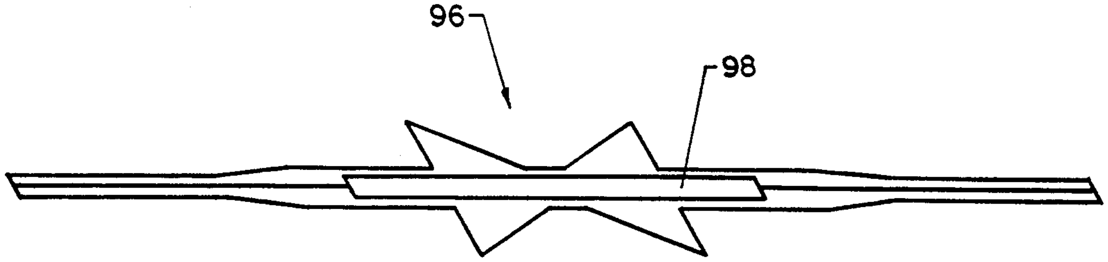

The second manner of use of the tag 10 for attachment to a part or component is by insertion of the tag 10 into a hole, cavity, depression, or the like, of the part or component itself, such as a threaded hole shown in FIG. 1. In this use, the serrations 20, 20', or 26, 26' will help to retain the tag 10 within the hole, and thereby prevent its accidental escape or falling out from the part being identified. Either end of the tag 10 may be inserted into the hole, or the like. The respective serrations will contact against the inner wall surface of the hole, depression, cavity, or the like, to frictionally hold the tag in place. Since the main body-portion 14 is made of flexible, pliable plastic, it may be bent in either of two ways: The main body-portion 14 may be bent or partially folded along its longitudinal axis, which approximately corresponds to the length of the steel wire 16, or may be bent transversely thereto about the middle section. These bendings, or foldings, of the plastic, main body-portion allow for the very same tag to be used with a range of diameters of holes or depressions of workpieces, parts, etc. For example, if the width of the main body-portion 14 is larger than the hole of the workpiece into which it is to be inserted, then one may fold it up along its longitudinal axis to fit it into the hole. Conversely, if the hole of the workpiece is larger than the maximum width of the main body-portion—which maximum width is taken between oppositely juxtapositioned teeth 20 20', or 26 and 26'—then one may transversely bend the main body-portion 14 about its middle section; since the main body-portion is inherently flexible, the normal bias of the main body-portion will cause to tend to separate the two halves 22, 24 away from each other, such biassed separation progressing until the hole in which the tag has been replaced prevents any further separation, whereby the tag will "fill up" the hole and be retained therein via the frictional contact between the teeth and the inner wall surface of the hole. It is noted that the teeth on the first half 22 are the mirror image of the teeth on the second half 24 of the main body-portion 14, so that, when maximum transverse bending about the middle section takes place, the serrations 26 lie flush with and are oriented the same way as the serrations 20 of the first half. The same holds true for the serrations 26' with respect to the errations 20'. Thus, all of the serrations of the main body are useful in retaining the tag 10 in hole when the tag is used after transverse bending. It will be noted that, in using the tag 10 for insertion into a hole, it has been shown that the serrations or teeth first inserted work against insertion, since, as can be seen in FIG. 1, the teeth 20, 20', for example, slope in the direction of insertion into the hole, so that the tag may be more easily removable. However, by inserting the tag more into the hole, the serrations on the other half, for example 26, 26' may be forced into the hole, which other serrations would more fully prevent removal of the tag 10 without more effort, such as more bending of the tag along the longitudinal direction. Just which teeth one wishes to have engaged within the hole will, of course, depend upon the environment, end use, and other variables, such as location of the hole; if the hole is overhead, then one may need to use the serrations 26, 26' to prevent the tag from falling down, whereas if the hole were below, one would use the serrations 20, 20', to prevent the tag from falling down the hole. Although when using the tag 10, when the serrations 26, 26' of FIG. 1 are pushed into the hole, the indicia 12 may not be readily visible from the outside, and may be obscured, still identification is easily achieved when the tag is pulled out. Alternatively, the indicia 12 may be so arranged on the main body-portion so that it extends along the entire length of the main body-portion, so that whatever position of the tag, its identifying mark is visible to the outside. Such extended, identifying marks, or indicia, may be simply providing each pair of tags in its own unique color, thereby providing color coding or matching; additional, full-length labels may be used, such as those shown in FIGS. 11–14. Of course, the indicia 12 may simply located at each end of the main body-portion, as shown in FIG. 10.

FIG. 5 shows a second embodiment of the tag for use in accordance with the method of the invention. The tag 30 is similar to the tag 10 of FIGS. 1–4, with the only difference being that each half of the main body-portion 32 is provided with only one serration or tooth 34, 34' and 36, 36' on each side edge-surface. Otherwise, the tag 30 is the same as the tag 10, and is used just as the tag 10 used, as described above.

FIG. 6 shows a third embodiment 40 which is similar to the tag 30. However, in this version, the small-diameter, steel wire 42 is completely covered by the plastic, main body-portion 44 from end to end. Thus, when using the tag 40, the ends 44',44" are twisted together just like the ends 16',16" of the tag 10, with the plastic covering over the ends of the wire 42 providing more comfort to the hand, as well as a greater degree of facility in untwisting the ends, when it is required to remove the tag 40 from its securement to a workpiece, electrical component, and the like. In order to provide the greatest flexibility to the ends 44',44", so as to allow for the easy twisting and untwisting thereof, the end portions 46, 46 of the main body-portion 42 taper inwardly until the ends 44', 44", which ends 44',44" terminate in a fine, point-like tip. FIG. 7 shows a modification 50 of the tag, which is basically identical to the tag 40 of FIG. 6, with the exception of the additional number of serrations or teeth on the side edge-surfaces of the two halves of the plastic, main body-portion, such as in the embodiment of FIGS. 1–4.

FIG. 8 shows yet another modification 54, where the plastic, main body-portion 56 completely covers or enshrouds the thin metal wire 58 along the entire length. Unlike the tags 40 and 50, the ends of the main body-portion 56 are not tapered. Also, the identifying indicia 58' is located on one end rather than in the middle, for the reasons discussed above with regard to seeing the indicia when the tag is inserted into a hole.

Figure 9:
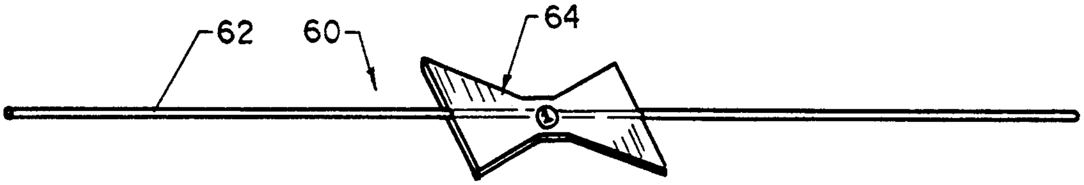
FIG. 9 is a perspective view of the tag of the invention according to a sixth embodiment thereof.

FIG. 9 is still anther modification 60 in which only a middle section of the thin, metal wire 62 is embedded in the plastic, main body-portion 64. This version allows a much more easy attachment of the tag around a workpiece.

FIG. 10 shows a tag 70 that has no serrations or teeth, unlike the other, above-described embodiments. The tag 70 has a rectangular-shaped, plastic, main body portion 72 which completely enshrouds a steel wire 74. Identifying indicia 76 are placed at the ends of the main body-portion to ensure visibility thereof, regardless of the end of the tag that is inserted into a hole.

FIGS. 11–14 show similar embodiments 80, 86, 90, 96, respectively, in which an elongated, identifying label 82, 88, 92, 98, respectively, is provided. Each label has an adhesive, rear coating, and has the identifying indicia located thereon at different locations to ensure the visibility of the indicia. Each label may, alternatively, be colored for matching with one other tag having a label of the same color, to provide color-coding identification of cooperating or mating disassembled parts. The label may be pressure-sensitive tape that is removable.

As explained above, the size and dimensions of the each tag will vary depending upon the particular use. Preferable, a kit would be provided consisting of many pairs of tags 10, or modifications thereof, of different size, so that many differently-sized workpieces or components may be labelled with the tags. For example, when using the tags for disassembled automobile engine-parts, tags of approximately 7 ½ inches in length may be provided, with a width of ⅜ of an inch, with the maximum width between two opposed teeth being 1 ¼ inches for fitting snugly in a 1-inch hole. In addition, while the serrations of the two halves of the main body-portion have been shown as being of the opposite sense, it is, of course, possible to make serrations all of the same sense, along the main body-portion, which would also allow insertion into a hole that is above or below, and retain the tag in the hole by either inserting one end or the other end first into the hole.

While specific embodiments of the invention have been shown and described, it is to be understood that numerous changes and modifications may be made therein without departing from the scope, spirit and intent of the invention as set forth in the appended claims.

What I claim is:

1. A method of identifying cooperating or mating parts comprising:

(a) removably attaching a first identifying tag having identifying indicia thereon to a first one of the cooperating parts; and (b) removably attaching a second identifying tag having the same identifying indicia thereon to a second one of the cooperating parts;

said step (a) comprising inserting the first tag into a hole of the first part; and said step (b) comprising enwrapping the second tag about a portion of the second part.

2. The method according to claim 1, wherein said steps (a) and (b) are performed while the first and second cooperating parts are disassembled.

3. The method according to claim 2, wherein the first and second cooperating parts are capable of forming an assembly, said method further comprising:

(c) removing the first tag from the first part at least not prior to the assembly of the first part with the second part;

(d) removing the second tag from the second part at least not prior to the assembly of the first part with the second part; and (e) coupling the first and second parts together.

4. The method according to claim 1, wherein the first and second cooperating parts are capable of forming an assembly, said method further comprising:

(c) removing the first tag from the hole of the first part at least not prior to the assembly of the first part with the second part; and (d) removing the second tag from its enwrapment about the second part at least not prior to the assembly of the first part with the second part; and (e) coupling the first and second parts together;

said step of enwrapping comprising twist-tying the ends of the tag about a portion of the second part.

5. The method according to claim 1, further comprising:

(c) before said steps (a) and (b), disassembling the first and second parts from each other.

6. The method according to claim 1, wherein each of said steps (a) and (b) is carried out while the first and second cooperating parts are assembled together.

7. The method according to claim 1, wherein said step (a) comprises bending the first tag along its longitudinal axis in order to fit the tag inside a smaller hole.

8. The method according to claim 1, wherein said step (a) comprises folding the first tag along its middle section in order to fit the tag inside a larger hole.

9. The method according to claim 1, wherein said step (a) comprises inherently preventing the first tag from falling entirely into the hole of the first part; said step of inherently preventing comprising contacting edge-surface portions of the first tag against interior wall surface portions of the hole of the first part.

10. The method according to claim 1, wherein each said identifying tag comprises attaching means comprising an elongated wire having at least a portion thereof embedded in a main body-portion made of flexible, pliable plastic having a pair of ends, the elongated wire at least extending entirely through said main body-portion and having opposite, distal ends capable of being twist-tied together for removably securing the tag about one part, the main elongated portion having a first side edge-surface and a second side edge-surface each of which said side edge-surfaces being serrated for use in inserting and retaining the tag in a hole of a cooperating part, wherein:

said step of inserting the first tag comprises inserting the serrated first and second side edge-surfaces of the first tag into the hole of the first part; and preventing the accidental removal of the first tag from the hole by means of the serrations of the first and second side edge-surfaces of the first tag.

11. The method according to claim 10, wherein said step of inserting the serrated first and second side edge-surfaces of the first tag into the hole of the first part comprises bending the main body portion of the first tag along its longitudinal axis, said step of bending bringing said serrated first and second side edge-surfaces closer toward each other, in order to fit the tag into a smaller hole.

12. The method according to claim 10, wherein said step of inserting the serrated first and second side edge-surfaces of the first tag into the hole of the first part comprises bending the main body portion of the first tag along its middle, transverse section in order to fit the tag into a larger hole.

13. The method according to claim 12, wherein said main elongated portion comprising a first half-length and a second half-length; said first and second edge-surfaces along said first half-length having a serrated surface in a first sense, and said first and second edges surfaces along said second half-length having a serrated surface in a second, opposite sense, whereby said serrated surfaces along the first half-length are mirror images of the serrates surfaces along the second half-length, said step of bending comprising: orienting the serrations of the first half-lengths in the same sense and orientation as the serrations of the second half-lengths.

14. The method according to claim 1, further comprising providing a plurality of pairs of said first and second tags, each said tags of each said pair being identical to the other tag of the respective said pair; said plurality of pairs of tags comprising at least one pair of tags of a first, smaller size, and at least one pair of tags of a second, larger size; said method comprising:

performing said steps (a) and (B) with one of said pairs of tags of said first, smaller size; and performing said steps (a) and (b) with one of said pairs of tags of said second, larger size.

15. A method of identifying cooperating or mating parts comprising:

(a) removably attaching a first identifying tag having identifying indicia thereon to a first one of the cooperating parts; and (b) removably attaching a second identifying tag having the same identifying indicia thereon to a second one of the cooperating parts;

each said identifying tag comprising attaching means comprising an elongated wire having at least a portion thereof embedded in a main body-portion made of flexible, pliable plastic having a pair of ends, the elongated wire having opposite, distal ends capable of being twist-tied together for removably securing the tag about one part;

each of said steps (a) and (b) comprising enwrapping the respective cooperating tag about a respective cooperating part and twist-tying together the respective distal ends of each said respective cooperating tag about the respective cooperating part.

16. The method according to claim 15, further comprising providing a plurality of pairs of said first and second tags, each said tag of each said pair being identical to the other tag of the respective said pair; said plurality of pairs of tags comprising at least one pair of tags of a first, smaller size, and at least one pair of tags of a second, larger size; said method comprising:

performing said steps (a) and (b) with a pair of tags of said first, smaller size; and performing said steps (a) and (b) with a pair of tags of said second, larger size.

* * * * *